United States Patent
Yoshikawa et al.

(10) Patent No.: US 6,744,063 B2
(45) Date of Patent: *Jun. 1, 2004

(54) IMAGE PICKUP DEVICE INCLUDING ELECTRON-EMITTING DEVICES

(75) Inventors: Takamasa Yoshikawa, Tsurugashima (JP); Hideo Satoh, Tsurugashima (JP); Atsushi Yoshizawa, Tsurugashima (JP); Takashi Yamada, Tsurugashima (JP); Takashi Chuman, Tsurugashima (JP); Nobuyasu Negishi, Tsurugashima (JP); Shingo Iwasaki, Tsurugashima (JP); Kazuto Sakemura, Tsurugashima (JP); Takuya Hata, Tsurugashima (JP); Kiyohide Ogasawara, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 368 days.

This patent is subject to a terminal disclaimer.

(21) Appl. No.: 09/754,253

(22) Filed: Jan. 5, 2001

(65) Prior Publication Data

US 2003/0048745 A1 Mar. 13, 2003

(30) Foreign Application Priority Data

Jan. 14, 2000 (JP) ........................................ 2000-006425

(51) Int. Cl.$^7$ ............................................. H01L 29/12
(52) U.S. Cl. .............................. 257/10; 257/10; 257/13
(58) Field of Search ...................... 257/10, 30; 313/309, 313/310, 495, 306, 444; 359/9; 438/20

(56) References Cited

U.S. PATENT DOCUMENTS

| | | | |
|---|---|---|---|
| 3,184,659 A | | 5/1965 | Cohen |
| 3,535,598 A | | 10/1970 | Feist ............................ 257/10 |
| 5,629,782 A | * | 5/1997 | Ichimura et al. ................ 359/9 |
| 5,801,485 A | * | 9/1998 | Van Veen et al. ............. 313/495 |
| 5,814,924 A | * | 9/1998 | Komatsu ...................... 313/309 |
| 5,821,679 A | * | 10/1998 | Makishima .................. 313/310 |
| 5,936,257 A | * | 8/1999 | Kusunoki et al. .............. 257/10 |
| 6,057,172 A | * | 5/2000 | Tomihari ....................... 438/20 |
| 6,274,881 B1 | * | 8/2001 | Akiyama et al. .............. 257/10 |
| 6,285,123 B1 | * | 9/2001 | Yamada et al. .............. 313/495 |
| 6,522,053 B1 | * | 2/2003 | Iwase et al. .................. 313/310 |
| 2001/0017369 A1 | * | 8/2001 | Iwasaki et al. ................ 257/10 |

FOREIGN PATENT DOCUMENTS

| | | |
|---|---|---|
| EP | 0 367 195 A2 | 5/1990 |
| EP | 0 986 084 A2 | 3/2000 |
| FR | 2 084 551 | 12/1971 |
| JP | 4-312752 | 11/1992 |
| JP | 5-6749 | 1/1993 |

OTHER PUBLICATIONS

European Search Report for EP 01 10 0012, dated May 15, 2001.
Patent Abstract of JP 2000 149766 A May 2000.

* cited by examiner

*Primary Examiner*—David Nelms
*Assistant Examiner*—Thinh T Nguyen
(74) *Attorney, Agent, or Firm*—Morgan, Lewis & Bockius LLP

(57) ABSTRACT

An image pickup device includes a pair of first and second substrate facing each other with a vacuum space interposed therebetween, and a plurality of electron-emitting devices provided over said first substrate and a photoconductive layer provided over said second substrate. Each electron-emitting device includes an insulating layer deposited over an electron source layer formed over an ohmic electrode; and a metal thin film electrode deposited over said insulating layer. The insulating layer and said metal thin film electrode have an island region of electron-emitting section in which their film thicknesses are gradually reduced toward said electron source layer.

8 Claims, 9 Drawing Sheets

IMAGE PICKUP DEVICE INCLUDING ELECTRON-EMITTING DEVICES

BACKGROUND OF THE INVENTION

1. Field of the Invention

The present invention relates to an image pickup device or image sensor, and more particularly, to an image pickup device comprising a plurality of electron-emitting devices arranged in, for example, a two-dimensional matrix.

2. Description of the Related Art

Electron-emitting devices in which electrons are drawn out by an electric field without the need of cathode heating are used as electron sources of field emission displays (FED). For example, according to the light emission principle of an FED having a pyramid-shaped Spindt-type cathodes, the light emission is achieved by drawing electrons out to a vacuum by a gate electrode disposed apart from a cathode, and having those electrons collided with a phosphor applied on a transparent anode in the same manner as a CRT (cathode ray tube) although there is a difference as the FED employs the cold cathode.

The use of cold cathode electron-emitting devices in an image pickup device has been proposed. For example, a vidicon electron tube device with increased emission efficiency by arranging a plurality of cathodes as described in JP-A-4-312752 is known.

However, this minute Spindt-type field emission source has a problem of low manufacturing production since it requires a large number of complicated manufacturing processes for the cold cathodes.

Also known is an image pickup device as disclosed in JP-A-5-6749, in which a plurality of cold cathodes of surface electron sources are arranged in a matrix to cause emitted electrons to be incident on a photoconductive film located in an imaging plane. As for the surface electron sources, electron-emitting devices having a metal-insulator-metal (MIM) structure are used.

However, the amount of electron emission is not sufficient even with the use of such MIM-type electron-emitting devices.

OBJECT AND SUMMARY OF THE INVENTION

An object of the present invention, which was invented in consideration of the above conditions, is to provide an image pickup device using electron-emitting devices that are capable of providing stable electron emission with a low voltage.

An image pickup device of the present invention comprises a pair of first and second substrates facing each other with a vacuum space therebetween; and a plurality of electron-emitting devices provided on the first substrate and a photoconductive film provided on the second substrate, the electron-emitting devices each comprising an insulating layer deposited over an electron source layer which is, in turn, formed over an ohmic electrode, and a metal thin film electrode deposited over the insulating layer, the insulating layer and the metal thin film electrode having electron-emitting sections as island regions in which their film thicknesses are gradually reduced toward the electron source layer.

In the image pickup device according to one aspect of the invention, said insulating layer is made of a dielectric material and has a film thickness of 50 nm or greater in an area other than said island region.

In the image pickup device according to one aspect of the invention, said metal thin film electrode terminates over said insulating layer within said island region.

In the image pickup device according to one aspect of the invention, said insulating layer terminates over said electron source layer within said island region.

In the image pickup device according to one aspect of the invention, said island region is a recess on a flat surface of said metal thin film electrode.

In the image pickup device according to one aspect of the invention, said insulating layer and said metal thin film electrode are deposited by one of a physical deposition method and a chemical deposition method.

In the image pickup device according to one aspect of the invention, bus lines are formed over a plurality of said metal thin film electrodes, said ohmic electrodes and said bus lines being stripe-shaped electrodes arranged in directions orthogonal to each other.

In the image pickup device according to one aspect of the invention, the device further comprises a reverse-tapered block within each of said island regions.

According to the present invention having the above configuration, within the island-like portions of the insulating layer and the metal thin film electrode, their film thicknesses are gradually reduced toward the electron source layer in a direction their interface lays, resulting in an increased amount of electrons emitted from those island regions, and since such electron-emitting devices are used for an image pickup device, miniaturization of the device can be achieved. In addition, since the emitted electrons exhibit favorable recticlinearlity, output signals (video signals) of high resolution may be obtained.

Furthermore, according to an image pickup device of the present invention, since the insulating layers of the electron-emitting devices have a large film thickness, through-hole are unlikely to occur so that the manufacturing yield would be improved.

DETAILED DESCRIPTION OF THE PREFERRED EMBODIMENTS

The embodiments of the present invention will now be explained with reference to figures.

Figure 1:
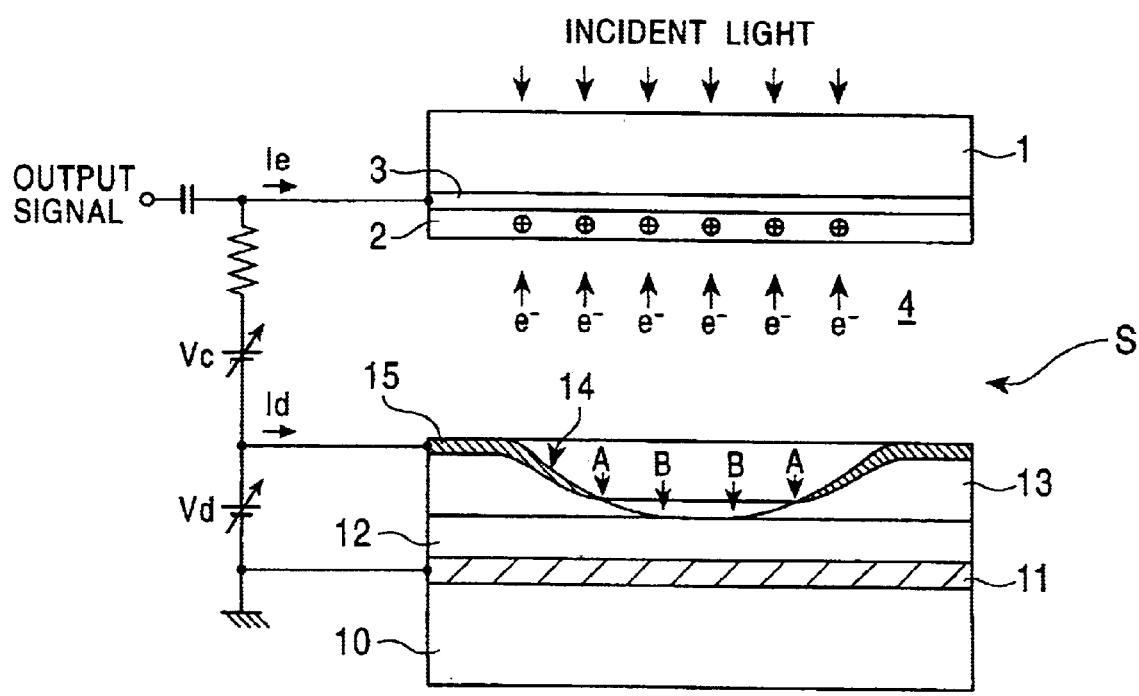
FIG. 1 is a schematic cross-sectional view of an electron-emitting device according to one embodiment of the present invention.

As shown in FIG. 1, an electron-emitting device S according to one embodiment is fabricated by forming an ohmic electrode 11 made of, for example, aluminum (Al), tungsten (W), titanium nitride (TiN), copper (Cu) or chrome (Cr) etc. over a glass substrate 10, forming thereon an electron source layer 12 made of a metal, a metal alloy or a semiconductor such as silicon (Si), forming thereon an insulating layer 13 made of $SiO_x$ (X=0.1–2.0) etc., and forming thereon a metal thin film electrode 15 made of, for example, white gold (Pt) or gold (Au) etc. It should be noted especially that the insulating layer 13 is made of a dielectric material, and it has an extremely large film thickness of 50 nm or greater in its flat section. The layers are formed through sputtering with the use of Ar, Kr, Xe gas or a mixture thereof, or one of these rare gases as a main component mixed with $O_2$ or $N_2$ etc., under sputtering conditions: gas pressure=0.1–100 mTorr, preferably 0.1–20 mTorr, growth rate=0.1–1000 nm/min, preferably 0.5–100 nm/min.

In addition, in the insulating layer 13 and the metal thin film electrode 15, island regions 14 in which their film thicknesses are gradually reduced toward the electron source layer 12 are formed. The film thicknesses of the insulating layer 13 and the metal thin film electrode 15 are gradually reduced together toward the center of each island region 14.

As shown in FIG. 1, the island region 14 is formed as a circular recess on the flat surface of the metal thin film electrode 15. Within the island region, the metal thin film electrode 15 terminates at an edge location A over the insulating layer 13. The insulating layer 13 within the island region 14 terminates at an edge location B over the electron source layer 12.

Figure 2:
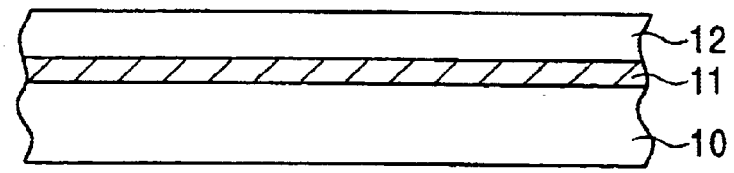
FIGS. 2 through 5 are partial expanded cross-sectional views of a device substrate during fabrication according to a manufacturing method of an electron-emitting device of the present invention.

The island region 14 as a recess is formed as follows. First, as shown in FIG. 2, on the substrate 10 over which the ohmic electrode 11 is formed, the electron source layer 12 is formed by sputtering.

Figure 3:
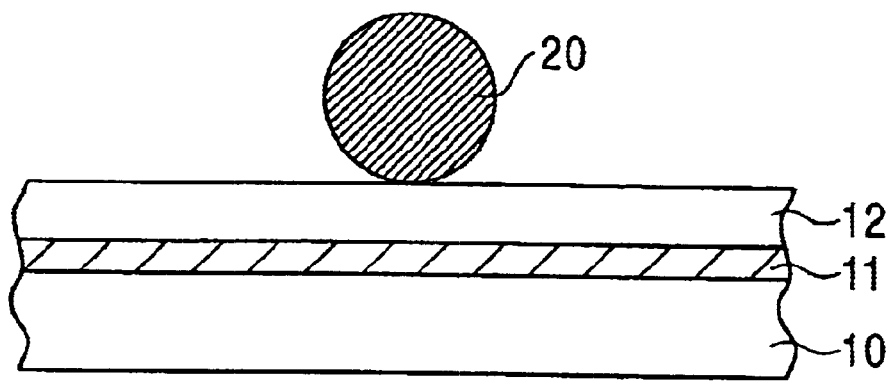

Thereafter, a plurality of spherical fine particles 20 are sprayed over the electron source layer 12 as shown in FIG. 3.

The electron emission can still be obtained even if the shape of the fine particles is non-spherical, however, spherical particles such as spacers for liquid crystal displays or ball mills etc. having isotropic shapes are desirable in consideration of their uniformity at grain boundaries, capability of being dispersed homogeneously over a film and lack of aggregation. Also, a smaller grain size distribution range is desirable. The diameter of the fine particles should be a size which allows a portion of fine particle geometry to be exposed over the surface of the metal thin film electrode on the electron-emission side, in other words, the particles should have a size which does not cause themselves to be completely buried. As for the material of the particles, an insulator, a semiconductor or a metal may be used. When fine particles made of a metal are used, since the device would have a risk of producing short-circuits, the fine particles must be eliminated completely after forming the metal thin film electrode 15 in a subsequent process.

Figure 4:
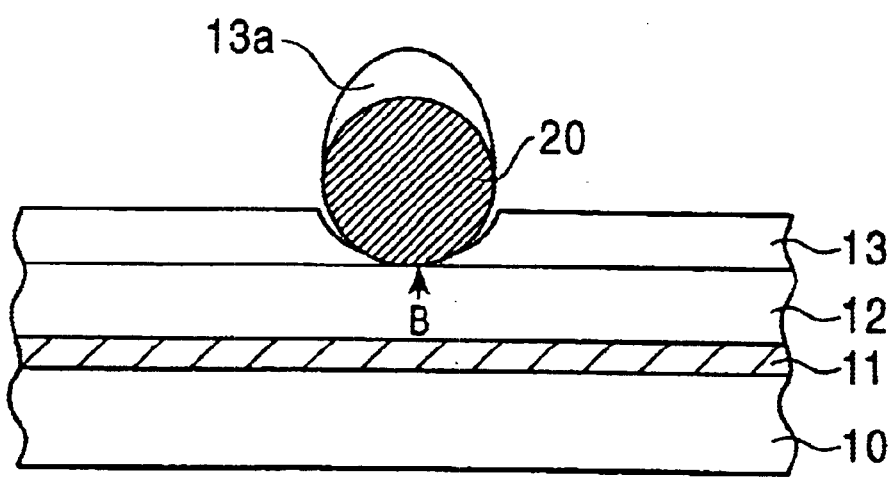

Next, as shown in FIG. 4, an insulator 13, 13a is deposited over the electron source layer 12 and the fine particles 20 to form the insulating layer 13 constituted by a thin film of the insulator. At this point, the insulator goes around to the areas surrounding contact portions between the electron source layer 12 and the fine particles 20, thereby forming the portions of the insulating layer in which its film thickness is gradually reduced from the given film thickness of the insulating layer 13 toward the electron source layer 12. The each portion of the insulating layer 13 in which its film thickness is gradually reduced terminates at the edge location B on the electron source layer 12 within the island region.

Figure 5:
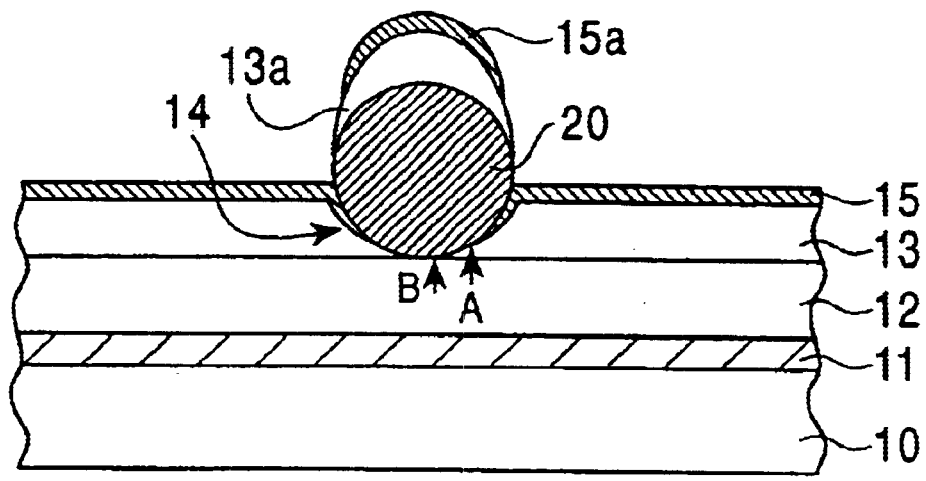

Thereafter, as shown in FIG. 5, a metal 15, 15a is deposited over the insulating layer 13 and the fine particles 20 to form the metal thin film electrode 15. At this point, the metal goes around to the areas around the contact portions between the electron source layer 12 and the fine particles 20 through the spacing between the insulating layer 13 and the fine particles 20, thereby forming the portions of the metal thin film electrode 15 in which its film thickness is gradually reduced from the given thickness of the metal thin film electrode 15. Each portion of the metal thin film electrode 15 in which its film thickness is gradually reduced terminates at the edge location A over the insulating layer 13 within the island region 14. In other words, there is a boundary (grain boundary) between each of the fine particles 20 and the insulating layer 13, or the metal thin film electrode 15, and from that boundary, the thicknesses of the insulating layer 13 and the metal thin film electrode 15 are continuously thinned toward the contact point between the fine particle and the electron source layer 12. In this way, the island regions 14, which are recesses, are formed within the insulating layer 13 and the metal thin film electrode 15 around the contact areas at the bottoms of the fine particles 20.

By eliminating the fine particles by ultrasonic cleaning etc. after the metal thin film electrode formation process, the concave island regions as circular recesses such as the island region 14 shown in FIG. 1 are formed.

After this particle elimination process, an electroconductive path growing process is performed to the device substrate 10 having island regions 14 in which the metal thin film electrode 15 terminates at the location on the portion of the insulating layer 13 where its film thickness is gradually reduced. In this electroconductive path growing process, a given level of current is generated by the application of a voltage between the metal thin film electrode 15 and the electron source layer 12. At this point, the portion of the insulating layer located between the edge "B" of the insulating layer 13 and the edge "A" of the metal thin film electrode 15 forms a so-called "site" which serves as a current path although it has a high resistivity, so that the current first start flowing through these sites. Upon this, Joule heat is generated and the growth of electroconductive paths is promoted on the surface or the inside of the insulating layer.

Next, although Si of the electron source layer 12 initially has a high resistivity, the electric resistance of the portions of Si located directly under these sites is locally and selectively reduced, and the amount of current in these portions increases. In this way, the electroconductive paths are collectively and uniformly gown in a shape of ring. Since Si initially has a high resistivity, undesired electrical breakdown may be avoided. This process also contributes to the stabilization of emission current.

Figure 6:
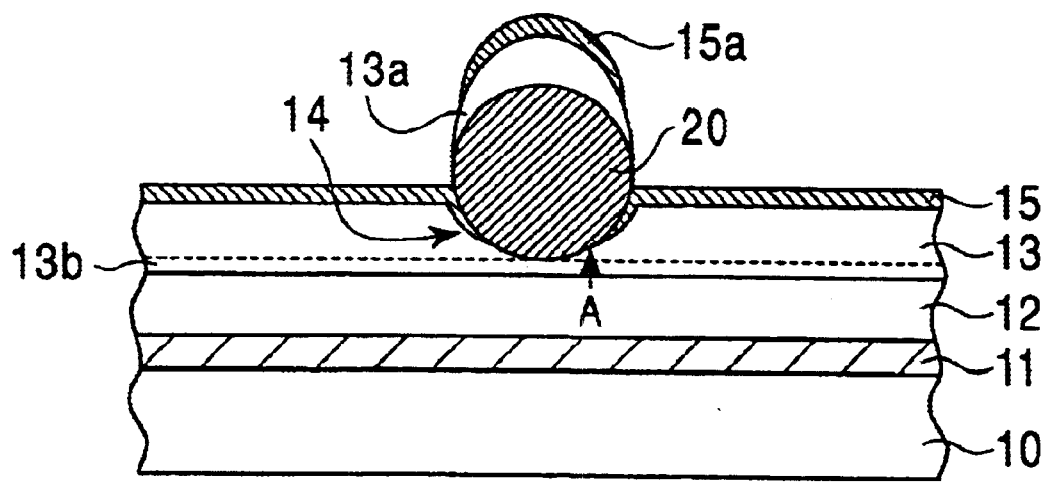
FIG. 6 is a partial expanded cross-sectional view of a device substrate during fabrication according to an alternative manufacturing method of the electron-emitting device of the present invention.

In the case of the above embodiment, the fine particles 20 are in contact with the electron source layer 12. In addition to this configuration, a preliminary insulating layer 13b may be formed through sputtering prior to the fine particle spraying process so as to isolate the fine particles 20 and the electron source layer 12 via the preliminary insulating layer 13b as shown in FIG. 6. In this case, the isolation distance should be within the range from several tens to several thousands angstroms. In this way, short-circuits between the electron source layer 12 and the metal thin film electrode 15 may be prevented.

Figure 7:
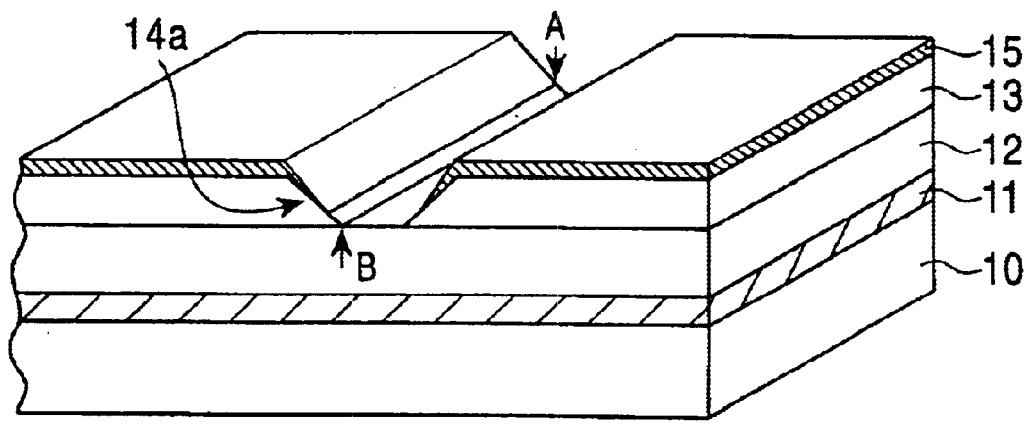
FIGS. 7 through 10 are partial expanded perspective views of alternative electron-emitting devices of the present invention.
Figure 8:
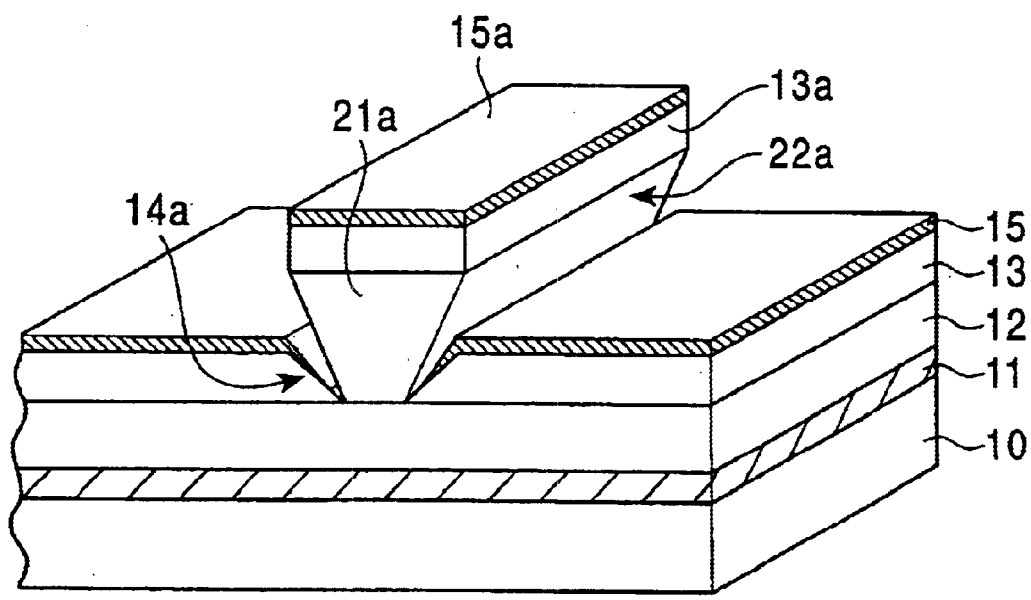
Figure 9:
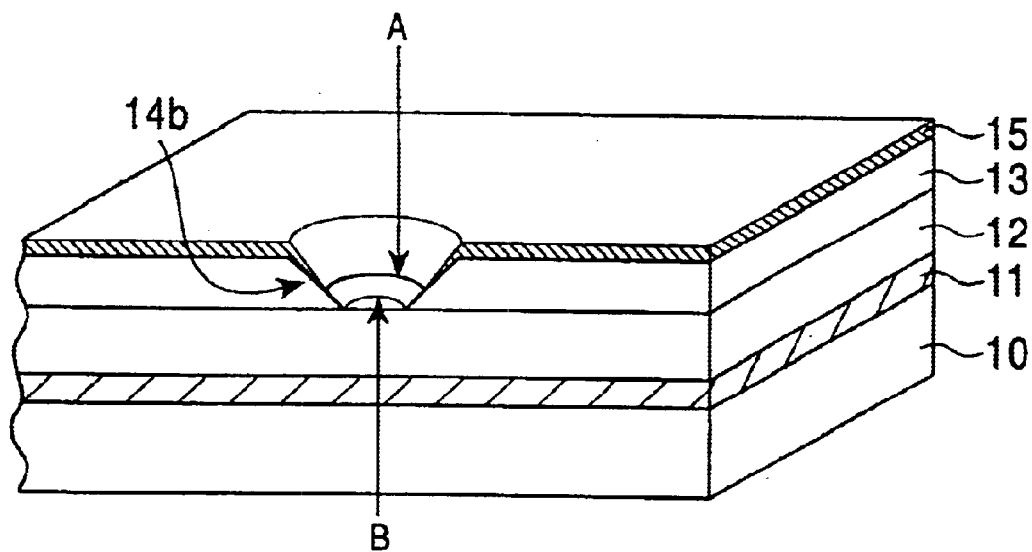
Figure 10:
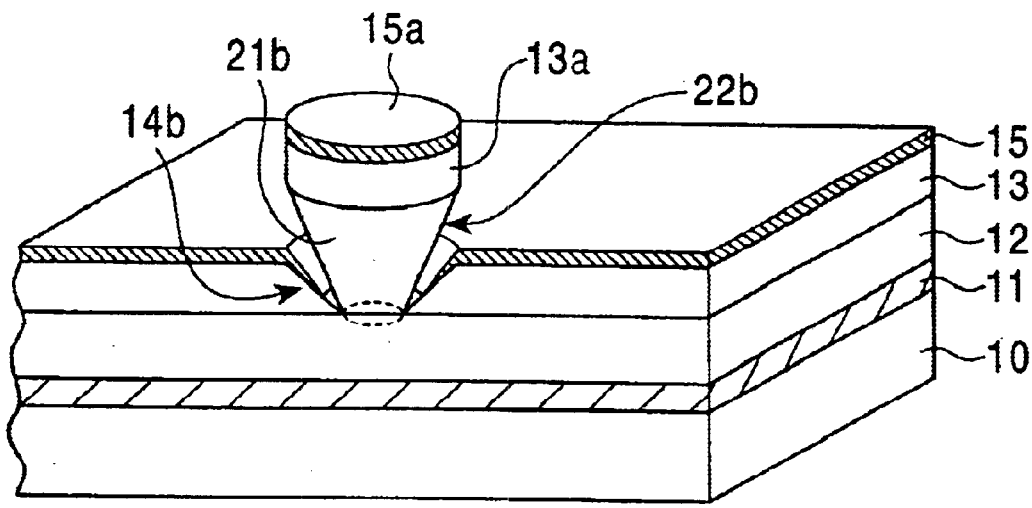

Moreover, the shape of the island regions 14 is not limited to the crater-like recess. An island region may instead be formed as a trench-like recess 14a or a cone-shaped recess 14b as shown in FIGS. 7 and 9 respectively, so that any desired shapes (i.e. rectangular etc.) and formation method may be employed. The trench-like island 14a and the cone-shape island 14b in the embodiments shown in FIGS. 7 and 9 are formed in the same manner as the above-described island region except that they employ line-type or dot-type tapered blocks 21a and column-like reverse-tapered blocks 21b in place of the fine particles as shown in FIGS. 8 and 10. The electron-emitting device may have the reverse-tapered blocks 21a or 21b on either the electron source layer 12 or the preliminary insulating layer 13b as shown in FIG. 6. The reverse-tapered blocks 21a, 21b are made of an electrically insulating material such as a resist, and each projects out in a direction normal to the substrate 10, and in its top portion has an overhang 22a or 22b projecting in a direction parallel to the substrate.

The electron-emitting device was explained as being provided with a plurality of recessed island regions 14 uniformly distributed across the surface by eliminating the fine particles 20, or the reverse-tapered blocks 21a or 21b as shown in FIGS. 1, 7 or 9, however, the device may have the reverse tapered blocks 21a or 21b retained at the centers of the recessed island regions 14 as shown FIGS. 6, 8 or 10.

The device substrate 10 of this electron-emitting device S is used as the first substrate, as shown in FIG. 1, and on the opposite side, a transparent second substrate 1 such as the glass substrate is disposed as a front substrate, or a face plate, with a vacuum space 4 provided therebetween. On the interior surface of the second substrate 1, a transparent electroconductive film 3 such as PbO, or so-called ITO, is provided beforehand, and a multi-layered photoconductive layer 2 made of As, Te, $Sb_2S_3$, Cd or amorphous Selenium (a-Se) etc. is then formed. The photoconductive layer 2 is connected to output circuits via the transparent electroconductive film 3.

The electron-emitting devices are diodes each with the metal thin film electrode 15 at the surface as the positive potential Vd and the ohmic electrode 11 at the backside as the ground potential. When a voltage Vd of, for example, approximately 90 V is applied between the ohmic electrode 11 and the metal thin film electrode 15 to inject electrons into the electron source layer 12, within an island region 14, the electrons travel from the edge "B" toward the edge "A" through the insulating layer 13 while being accelerated by the voltage Vd, and they are partially turned into hot electrons. Among the electrons reaching the proximity to the metal thin film electrode 15 those electrons having work functions higher than that of the metal thin film electrode 15 are emitted into the vacuum. Hot electrons are electrons having higher energy than that of photons.

These electrons e (emission current Ie) emitted from the recesses of the island regions 14 are accelerated by a high acceleration voltage Vc (i.e. approximately 5 kV) applied to the opposing photoconductive layer (transparent electrode) 2, and reach to the photoconductive layer 2. Through the coupling of the electrons reached and accumulated charges (charges, or holes, generated by the strength of incident light), an output signal (video signal) is obtained.

Figure 17:
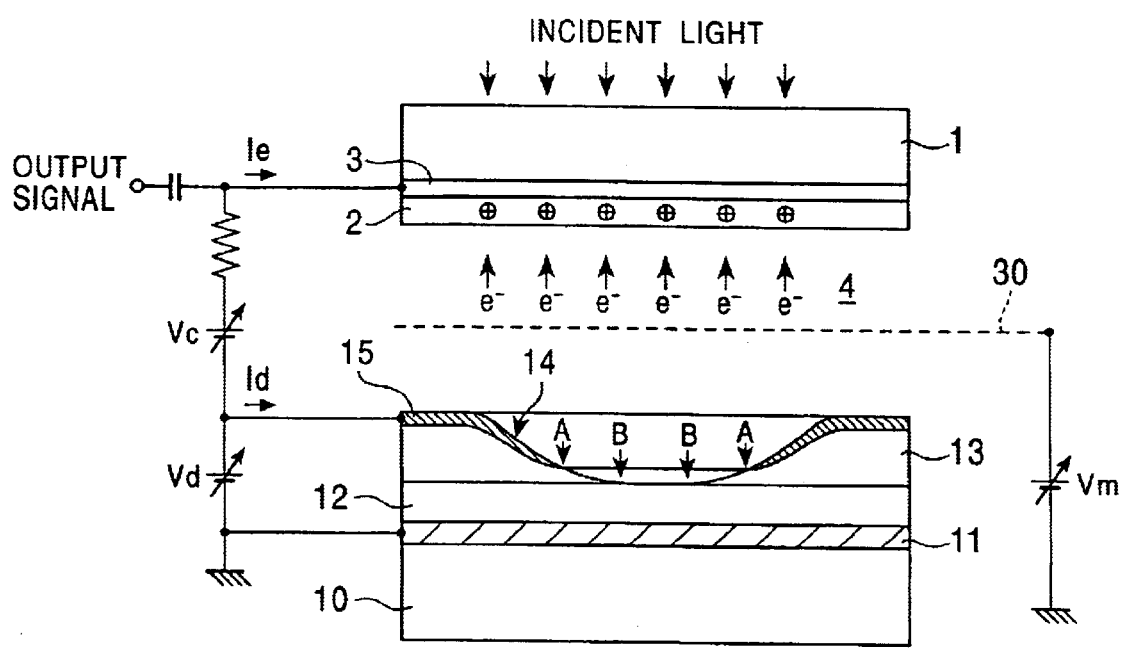
FIG. 17 is a schematic cross-sectional view of an electron-emitting device according to another embodiment of the present invention.

The above configuration shown in FIG. 1 may fundamentally be capable of functioning as an image pickup device, but in the addition to the image pickup device of the above configuration, a mesh electrode 30 may be provided within the vacuum space 4 in the image pickup device as shown in FIG. 17. By the application of an intermediate voltage Vm to the mesh electrode 30, the image pickup device is improved in directivity of the electron beams, and thus the improved resolution of the device. In this case, the combination of the values of the respective voltages is, for example, Vd<Vm<Vc.

In general, an MIM-type or MIS-type electron-emitting device having an insulating layer as thick as several tens of nanometers to several micrometers, as manufactured, is not yet capable of providing electron emission. A process called "forming" is required, in which a voltage is applied between it and the ohmic electrode so as the metal thin film electrode would become a positive pole. The forming process differs from so-called electrical breakdown, and it has not yet been clearly explained although there have been various hypotheses such as those attempting to explain it as; the diffusion of electrode material into the insulating layer; the crystallization within the insulating layer; the growth of electroconductive paths called filaments; the stoichiometric deviation of the insulator composition and so forth. The controllability of this forming process is extremely low, and it is difficult to manufacture the devices with high stability and good reproducibility. Moreover, there is a fact that the growing locations of such forming sites are contingent across the electrode surface, so that originating points of electron emission (electron emission source) cannot be specified. In other words, the originating points of the electron emission cannot be formed homogeneously across the surface of the device, resulting in extremely poor uniformity of the electron emission pattern.

In an electron-emitting device according to the embodiments of the present invention, the island regions 14 are formed, in which the insulating layer is gradually thinned locally (in other words, the film thickness thereof is gradually reduced), and the edges of the metal thin film electrode 15 are located on the portions of the insulating layer 13 at which its film thickness is gradually reduced, thereby forming the electron-emitting sections. Even with this device, a sufficient level of electron emission can be obtained, however, the electroconductive path growing process may further be performed. By this process, the minute electroconductive structures present on the surface or inside of the insulating layer within the electron-emitting sections are grown or increased. When such a device is operated, strong fields are centered at these minute structures, and the emission is assumed to be promoted by these structures that serve as the emission sites. Since the electron-emitting sections having an even size, shape and condition may be formed uniformly over the entire surface of the device with the use of evenly sized and shaped particles etc., a favorable electron emission pattern may be obtained.

As for the electron emission efficiency, since only the island regions 14 within the plane of the device function as electron sources and also as electroconductive paths, it is believed that extremely high efficiency in the electron emission may be obtained without leak current.

As for the material of the electron source layer 12 of the electron-emitting device, Si is especially effective, however, it is also possible to use amorphous silicon (a-Si), hydrogenated amorphous silicon (a-Si:H) in which the dangling bonds of a-Si are terminated with hydrogen (H), or a compound semiconductor such as hydrogenated amorphous silicon carbide (a-SiC:H) in which a part of Si is replaced with carbon (C) or hydrogenated amorphous silicon nitride (a-SiN:H) in which a part of Si is replaced with nitrogen (N), or silicon doped with boron, gallium, phosphorus, indium, arsenic, orantimony. Instead of using Si, a single semiconductor or a compound semiconductor of group IV, III–V, or II–VI such as germanium (Ge), Ge—Si, silicon carbide (SiC), gallium arsenide (GaAs), indium phosphide (InP), cadmium selenide or $CuInTe_2$ etc. may also be used for the electron source layer.

Metals such as Al, Au, Ag and Cu etc. are also effective for the material of the electron source layer 12, but it is also possible to use Sc, Ti, Cr, Mn, Fe, Co, Ni, Zn, Ga, Y, Zr, Nb, Mo, Tc, Ru, Rh, Pd, Cd, Ln, Sn, Ta, W, Re, Os, Ir, Pt, Tl, Pb, La, Ce, Pr, Nd, Pm, Sm, Eu, Gd, Tb, Dy, Ho, Er, Tm, Yb, Lu or the like.

As for the dielectric material of the insulating layer 13, although silicon oxide ($SiO_x$) (x represents an atomic ratio) is especially effective, it may be a metal oxide or a metal nitride such as $LiO_x$, $LiN_x$, $NaO_x$, $KO_x$, $RbO_x$, $CsO_x$, $BeO_x$, $MgO_x$, $MgN_x$, $CaO_x$, $CaN_x$, $SrO_x$, $BaO_x$, $ScO_x$, $YO_x$, $YN_x$, $LaO_x$, $LaN_x$, $CeO_x$, $PrO_x$, $NdO_x$, $SmO_x$, $EuO_x$, $GdO_x$, $TbO_x$, $DyO_x$, $HoO_x$, $ErO_x$, $TmO_x$, $YbO_x$, $LuO_x$, $TiO_x$, $ZrO_x$, $ZrN_x$, $HfO_x$, $HfN_x$, $ThO_x VO_x$, $VN_x$, $NbO_x$, $NbN_x$, $TaO_x$, $TaN_x$, $CrO_x$, $CrN_x$, $MoO_x$, $MoN_x$, $WO_x$, $WN_x$, $MnO_x$, $ReO_x$, $FeO_x$, $FeN_x$, $RuO_x$, $OsO_x$, $CoO_x$, $RhO_x$, $IrO_x$, $NiO_x$, $PdO_x$, $PtO_x$, $CuO_x$, $CuN_x$, $AgO_x$, $AuO_x$, $ZnO_x$, $CdO_x$, $HgO_x$, $BO_x$, $BN_x$, $AlO_x$, $AlN_x$, $GaO_x$, $GaN_x$, $InO_x$, $SiN_x$, $GeO_x$, $SnO_x$, $PbO_x$, $PO_x$, $PN_x$, $AsO_x$, $SbO_x$, $SeO_x$, $TeO_x$ or the like.

It is also effective, for the dielectric material of the insulating film 13, to use a complex metal oxide such as $LiAlO_2$, $Li_2SiO_3$, $Li_2TiO_3$, $Na_2Al_{22}O_{34}$, $NaFeO_2$, $Na_4SiO_4$, $K_2SiO_3$, $K_2TiO_3$, $K_2WO_4$, $Rb_2CrO_4$, $CS_2CrO_4$, $MgAl_2O_4$, $MgFe_2O_4$, $MgTiO_3$, $CaTiO_3$, $CaWO_4$, $CaZrO_3$, $SrFe_{12}O_{19}$, $SrTiO_3$, $SrZrO_3$, $BaAl_2O_4$, $BaFe_{12}O_{19}$, $BaTiO_3$, $Y_3Al_5O_{12}$, $Y_3Fe_5O_{12}$, $LaFeO_3$, $La_3Fe_5O_{12}$, $La_2Ti_2O_7$, $CeSnO_4$, $CeTiO_4$, $Sm_3Fe_5O_{12}$, $EuFeO_3$, $Eu_3Fe_5O_{12}$, $GdFeO_3$, $Gd_3Fe_5O_{12}$, $DyFeO_3$, $Dy_3Fe_5O_{12}$, $HoFeO_3$, $Ho_3Fe_5O_{12}$, $ErFeO_3$, $Er_3Fe_5O_{12}$, $Tm_3Fe_5O_{12}$, $LuFeO_3$, $Lu_3Fe_5O_{12}$, $NiTiO_3$, $Al_2TiO_5$, $FeTiO_3$, $BaZrO_3$, $LiZrO_3$, $MgZrO_3$, $HfTiO_4$, $NH_4VO_3$, $AgVO_3$, $LiVO_3$, $BaNb_2O_6$, $NaNbO_3$, $SrNb_2O_6$, $KTaO_3$, $NaTaO_3$, $SrTa_2O_6$, $CuCr_2O_4$, $Ag_2CrO_4$, $BaCrO_4$, $K_2MoO_4$, $Na_2MoO_4$, $NiMoO_4$, $BaWO_4$, $Na_2WO_4$, $SrWO_4$, $MnCr_2O_4$, $MnFe_2O_4$, $MnTiO_3$, $MnWO_4$, $CoFe_2O_4$, $ZnFe_2O_4$, $FeWO_4$, $CoMoO_4$, $CoTiO_3$, $CoWO_4$, $NiFe_2O_4$, $NiWO_4$, $CuFe_2O_4$, $CuMoO_4$, $CuTiO_3$, $CuWO_4$, $Ag_2MoO_4$, $Ag_2WO_4$, $ZnAl_2O_4$, $ZnMoO_4$, $ZnWO_4$, $CdSnO_3$, $CdTiO_3$, $CdMoO_4$, $CdWO_4$, $NaAlO_2$, $MgAl_2O_4$, $SrAl_2O_4$, $Gd_3Ga_5O_2$, $InFeO_3$, $MgIn_2O_4$, $Al_2TiO_5$, $FeTiO_3$, $MgTiO_3$, $Na_2SiO_3$, $CaSiO_3$, $ZrSiO_4$, $K_2GeO_3$, $Li_2GeO_3$, $Na_2GeO_3$, $Bi_2Sn_3O_9$, $MgSnO_3$, $SrSnO_3$, $PbSiO_3$, $PbMoO_4$, $PbTiO_3$, $SnO_2$—$Sb_2O_3$, $CuSeO_4$, $Na_2SeO_3$, $ZnSeO_3$, $K_2TeO_3$, $K_2TeO_4$, $Na_2TeO_3$, $Na_2TeO_4$ or the like, or a sulfide such as FeS, $Al_2S_3$, MgS or ZnS etc., a fluoride such as LiF, $MgF_2$ or $SmF_3$ etc., a chloride such as HgCl, $FeCl_2$ or $CrCl_3$ etc., a bromide such as AgBr, CuBr or $MnBr_2$ etc., an iodide such as $PbI_2$, CuI or $FeI_2$ etc., or a metal oxide nitride such as SiAlON or the like.

Furthermore, carbon such as diamond or fullerene ($C_{2n}$), or a metal carbide such as $Al_4C_3$, $B_4C$, $CaC_2$, $Cr_3C_2$, $Mo_2C$, MOC, NbC, SiC, TaC, TiC, VC, $W_2C$, WC or ZrC etc. is also effective. Fullerene ($C_{2n}$) is a spherical-shell like molecule made up of carbon atoms only, ranging from $C_{32}$ through $C_{960}$, among which the most known is $C_{60}$. The "x" suffix on the above terms such as "$O_x$" or "$N_x$" represents an atomic ratio.

The thickness of the insulating layer in the flat portion other than the island regions 14 is 50 nm or greater, preferably from 100 to 1000 nm.

As for the material of the metal thin film electrode 15 on the electron-emitting side, metals such as Pt, Au, W, Ru or Ir are effective, but Be, C, Al, Si, Sc, Ti, V, Cr, Mn, Fe, Co, Ni, Cu, Zn, Ga, Y, Zr, Nb, Mo, Tc, Rh, Pd, Ag, Cd, In, Sn, Ta, Re, Os, Tl, Pb, La, Ce, Pr, Nd, Pm, Sm, Eu, Gd, Tb, Dy, Ho, Er, Tm, Yb or Lu etc. may also be use.

As for the film formation method in manufacturing such electron-emitting devices, a physical or chemical method is used. The physical methods are known as physical vapor deposition (PVD) and include a vacuum deposition method, molecular beam epitaxy method, sputtering method, ionized vapor deposition method and laser abrasion method. The chemical methods are known as chemical vapor deposition (CVD) and include thermal CVD, plasma CVD and MOCVD (metal-organic chemical vapor deposition) etc. Among these methods, the sputtering method is especially effective.

Electron-emitting devices using electron source layers of Si added with boron (B) according to the present invention were fabricated, and their characteristics were examined.

First, a flat glass substrate for the use as a backside substrate was cleaned and sufficiently dried, and on its one surface, an ohmic electrode of TiN was formed to a thickness of 220 nm by a reactive sputtering. Thereon, an electron source layer of Si to which boron was doped to 0.15 atm % was formed to a thickness of 5000 nm. A plurality of such electron source layer substrates were fabricated.

As the first embodiment, fine particles were sprayed over the electron source layer of the electron source layer substrate to form a particle-sprayed substrate as shown in FIG. 5. In this embodiment, spherical particles (hereinafter also referred to as spacers) having a diameter of 1.0 μm were used. The material used for the fine particle was $SiO_2$, and the distribution range of the diameters of the particles was extremely small. For the dispersion of the particles, a known spacer spray method employed in the fabrication of liquid crystal display apparatus was used. Among the available methods including dry-spray type methods and wet-spray type methods, a wet-spray method was used for this device.

The spherical particles were dispersed within an ethyl alcohol solution and sufficiently stirred so that they do not cling together. This dispersed solution was then applied to the electron source layer of Si by spin coating. After that ethyl alcohol was eliminated. In this way, the spherical particles were homogeneously coated over the Si electron source layer as shown FIG. 3. The distribution density of the particles on the Si electron source layer was approximately 140 pieces/$mm^2$. After the processes shown in FIGS. 4 and 5, a plurality of such particle-attached substrates for image pickup devices each having particles within recesses formed by island regions were fabricated.

As the second embodiment, in order to obtain particle-sprayed substrates each including a preliminary insulating layer isolating the particles and the electron source layer as shown in FIG. 6, a plurality of particle-sprayed substrates were fabricated in the same configuration as the first embodiment, except that they included the preliminary insulating layers of $SiO_2$ with a 50 nm-thick that were formed by sputtering immediately before the particle spray process.

Furthermore, as the third embodiment, over the electron source layers of the electron source layer substrates mentioned above, reverse-tapered blocks were formed as shown in FIG. 8, thereby fabricating a plurality of block substrates. For the resist as the material of the reverse-tapered blocks, a novolac-type photo resist was used. For the application of the resist, a commonly used spin-coat method was employed. After the application of the resist, a desired resist pattern was formed over the Si electron source layer using a photo mask, through pre-bake, exposure, post-bake and development processes. Any desired shape may be used for the pattern, but a sufficient height from the Si electron source layer is required so as that the pattern would not be buried within the insulating layer formed subsequently. In this embodiment, linear-type reverse-tapered blocks having a width of 5000 nm and a height of 4000 nm or column-type reverse-tapered blocks having a diameter of 2.0 µm and a height of 4000 nm made of the resist were formed over the Si electron source layer. The reverse-tapered blocks of the resist (hereinafter also referred to as resist) used in this embodiment had a reverse-tapered shape in their cross-section, however, any arbitrary taper angle may be used, or even the blocks do not have to have the tapers at all. In this manner, a plurality of block substrates having the resist were fabricated.

Thereafter, insulating layers of $SiO_2$ were formed to a thickness of 330 nm over the electron source layers of the respective device substrates fabricated as the first through third embodiments via reactive sputtering with the introduction of oxygen. At this point, projecting features of the spherical particles and the reverse-tapered blocks were still exposed over the surfaces. Of course, this $SiO_2$ was formed also over the top surfaces of the particles and the reverse-tapered blocks. The neighboring regions of the areas in which the particles or the reverse-tapered blocks were in contact with the Si electron source layer (grain boundary) were the regions which fall under the shades of the overhangs, so that the deposition in these regions occurred by "going-around" of the sputtering gas, and the resulted film thickness of the insulating layer in these regions was gradually reduced toward the contact areas.

Masks of the metal thin film electrodes were then disposed over the $SiO_2$ insulating layers, and thin films of Pt or Au were formed through sputtering to a thickness of 10 nm, thereby fabricating a plurality of device substrate of electron-emitting devices. At this time, although the surface treatment of the insulating layers is not necessarily required prior to the metal thin film electrode formation, sputter-etching may be performed on the surface of the insulating layers prior to the formation of the electrodes. This is done because the sputter-etching would etch and reform the boundary sections between the particles and the insulator (or between the resist and the insulator) so as to facilitate the "going-around" of the electrode material onto the boundary regions between the particles and the insulator (or between the resist and the insulator), thus further effective electron emission may be obtained. The sputter etching would leave ring-like tracks, reflecting the shape of the particles (or ring-like or linear tracks reflecting the shape of the resist pattern), on the surfaces of the devices.

In the present embodiments, the sputter etching was performed over all the devices prior to the formation of the top metal thin film electrodes.

Furthermore, as the fourth embodiment, a plurality of device substrates of electron-emitting devices S were fabricated, in which the sprayed particles were eliminated from the particle-sprayed substrates of the above-mentioned first embodiment, leaving only the recessed island regions without particles as shown in FIG. 1. These devices of the fourth embodiment were fabricated through the same processes as the first embodiment except that the sprayed particles or the resist patterns were eliminated from the electron-emitting device substrates of the first embodiment which included the particles by ultrasonic cleaning with at least one liquid of water, acetone, ethanol, methanol and isopropyl alcohol etc.

Still further, as the fifth embodiment, a plurality of device substrates of electron-emitting devices S were fabricated, in which the resist was eliminated from the block substrates of the electron-emitting devices of the above-mentioned third embodiment which included the resist, leaving only the recesses and trenches. The devices of the fifth embodiment were fabricated through the same processes as the third embodiment except that the resist patterns were eliminated from the block substrates of the third embodiment which included the resist by ultrasonic cleaning with the use of water, acetone, ethanol, methanol and isopropyl alcohol etc.

Also, as comparative samples, a plurality of device substrates of electron-emitting devices having no recesses and trenches were fabricated through the same processes as the above embodiments except that the samples were not provided with the sprayed particles or the resist.

On the other hand, transparent glass substrates 1 each having a photoconductive layer provided over its interior surface were formed.

The each of above various device substrates and the transparent substrate were disposed in parallel so as the metal thin film electrodes and the photoconductive layer face each other, and they were held by spacers at 0.2 to 5 mm apart, and the space therebetween was vacuumed to $10^{-7}$ Torr or $10^{-5}$ Pa, to form an assembly of the electron-emitting devices.

As to the fabricated device, the device voltage Vps, 0 to 120 V were applied to between the metal thin film electrode and the ohmic electrode, and the diode current Id and the emission current Ie were measured for each of the devices. The results are shown in the Table 1 below. In this table, the "Device Structure" column represents the materials in a sequence of ohmic electrode/electron source layer/island region/insulating layer/metal thin film electrode, corresponding to the structures of the above embodiments.

TABLE 1

| | Device Structure | Voltage V | Id (A/cm$^2$) | Ie (A/cm$^2$) | Efficiency (%) |
|---|---|---|---|---|---|
| Embodiment 1 | TiN/Si + B/spacer/SiO$_2$/Pt | 90 | 5.90 × 10$^{-2}$ | 6.94 × 10$^{-3}$ | 10.52 |
| | TiN/Si + B/spacer/SiO$_2$/Au | 90 | 9.28 × 10$^{-2}$ | 2.12 × 10$^{-2}$ | 18.60 |
| Embodiment 2 | TiN/Si + B/SiO$_2$(50 nm)/spacer/SiO$_2$/Pt | 90 | 4.00 × 10$^{-2}$ | 1.11 × 10$^{-3}$ | 2.71 |
| Embodiment 3 | TiN/Si + B/resist/SiO$_2$/Pt | 65 | 4.00 × 10$^{-1}$ | 5.72 × 10$^{-3}$ | 1.41 |
| Embodiment 4 | TiN/Si + B/spacer(eliminated)/SiO$_2$/Pt | 90 | 3.64 × 10$^{-2}$ | 5.34 × 10$^{-3}$ | 12.80 |
| Embodiment 5 | TiN/Si + B/resist(eliminated)/SiO$_2$/Pt | 77 | 1.99 × 10$^{-2}$ | 5.61 × 10$^{-3}$ | 21.99 |
| Comparative Sample | TiN/Si + B/SiO$_2$/Pt | 108 | 6.79 × 10$^{-5}$ | 1.19 × 10$^{-5}$ | 14.91 |

As can be seen from Table 1, in any of the electron-emitting devices having the recessed island regions, the emission current is obtained. Especially, the devices having the structures of Embodiment 1 (TiN/Si+B/spacer/SiO$_2$/Pt or Au), a significant increase in the emission current relative to the comparative sample was observed.

Figure 11:
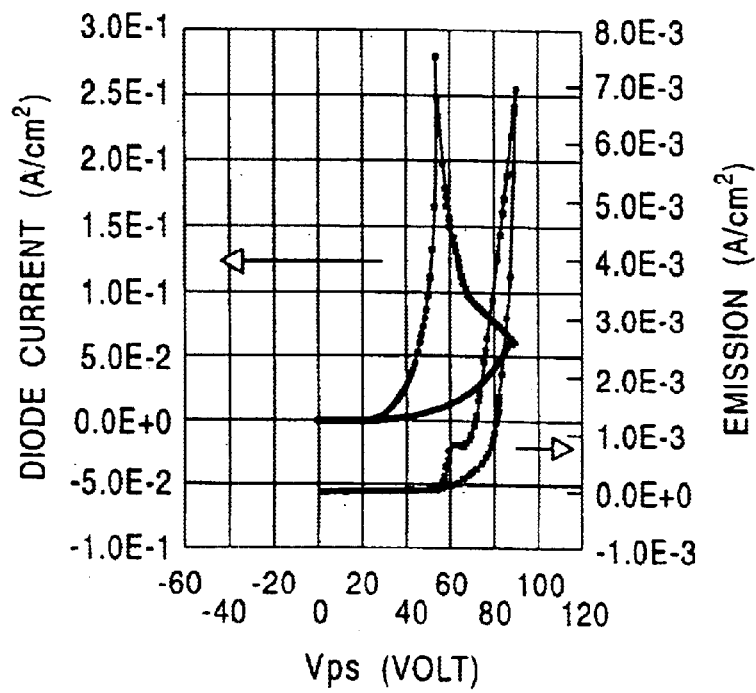
FIG. 11 is a graphical representation indicating the variation in diode current Id and emission current Ie of an electron-emitting device having a plurality of island regions in which the film thicknesses of the insulating layer and the metal thin film electrode are gradually reduced, plotted against applied device voltage Vps.
Figure 12:
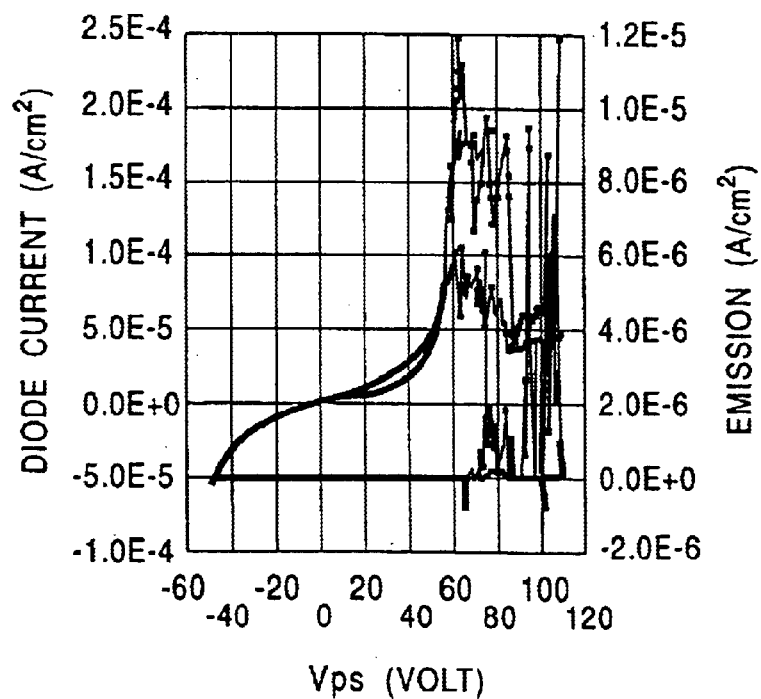
FIG. 12 is a graphical representation of the variation in diode current Id and emission current Ie of a comparative electron-emitting device plotted against applied device voltage Vps.

The change in the diode current Id and the emission current Ie of the electron-emitting device of Embodiment 1 and the comparative sample in relation with the application of device voltages Vps from 0 to 90 V are respectively shown in FIGS. 11 and 12. From these graphs, it can be seen that the electron-emitting device having the recessed island regions has a higher emission electron characteristic than the comparative sample by two orders and that the emission current markedly increase. The maximum emission current of this embodiment was 6.9×10$^{-3}$ A/cm$^2$ and that of the comparative sample was 1.2×10$^{-5}$ A/cm$^2$. According to the calculation based on the fact that approximately 140 recessed island regions are present in every 1 mm$^2$, the average electron emission obtained from each of the recessed island regions would be approximately 5.0×10$^{-7}$ A. It is also seen that the electron-emitting device having the recessed island regions exhibits more stable emission current Ie and diode current Id with smaller changes when compared to the comparative sample.

Furthermore, with the condition of either one of the above embodiment, devices were fabricated to have film thicknesses ranging from 50 nm to 1000 nm with the total thicknesses of their insulating layers being 50 nm or greater, and through the application of a voltage 200 V or lower, their emission efficiencies were measured to see the variation in the electron emission efficiencies [Ie/(Ie+Id)×100%] in relation with the thicknesses of the insulating layers. The results of the measurements indicated that emission efficiencies of 0.1% or greater can be obtained with devices having film thicknesses between 50 nm and 1000 nm with the thicknesses of their insulating layers being 50 nm or greater.

Furthermore, it was confirmed that devices having Si electron source layer not doped with boron (B) would have the same effect.

Figure 13:
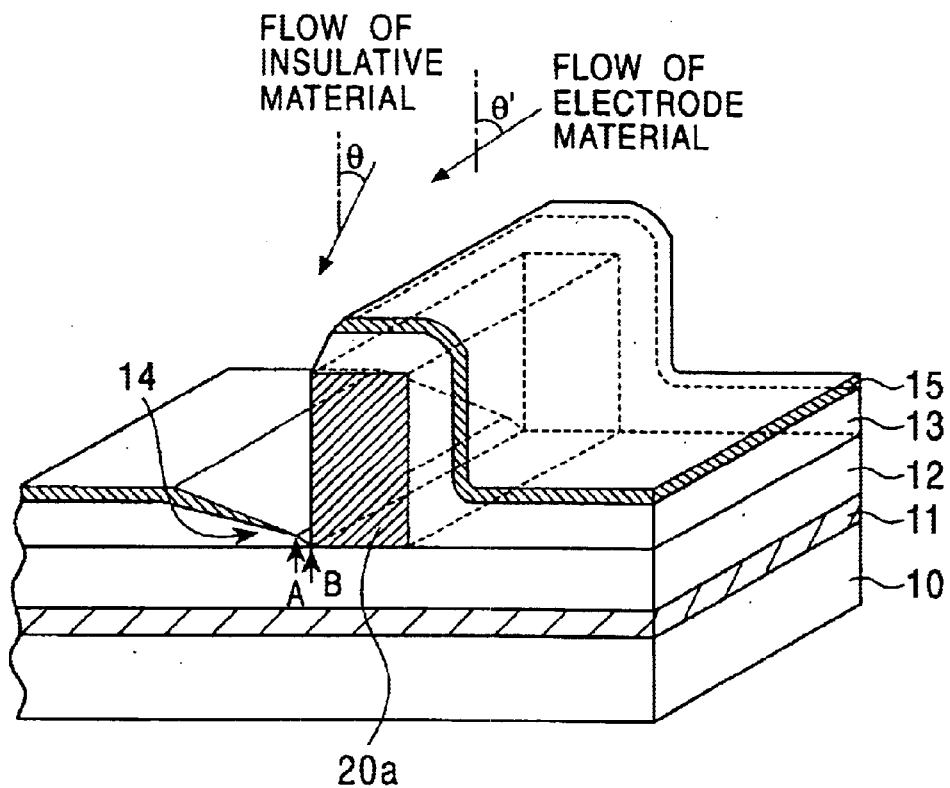
FIGS. 13 and 14 are partial expanded perspective views of other alternative electron-emitting devices of the present invention.

In the above embodiments, the electron-emitting device was explained as having recessed or trench-like island regions within its insulating layer and the metal thin film electrode where the film thicknesses thereof are gradually reduced together toward the centers of the regions. However, the device may have the insulating layer and the metal thin film electrode having film thicknesses gradually reduced together off the centers of the island regions. For example, as an alternative embodiment, an island region 14 may be provided on one side of a trench-like recess in which the film thicknesses of the insulating layer 13 and the metal thin film electrode 15 are gradually reduced together toward a masking wall 20 as shown in FIG. 13.

The island region 14 shown in FIG. 13, which constitutes a portion of the trench-like recess, may be formed as follows. First, a masking wall 20 made of a resist etc. is formed in the same manner as the line-type tapered block 21a shown in FIG. 8 on a substrate 10 having an ohmic electrode 11 and an electron source layer 12 sequentially formed thereon. An insulating layer 13 is then formed by sputtering. In this sputtering process, the surface of the electron source layer 12 on the substrate 10 is so disposed to have a tilt relative to the flowing direction of the sputtered insulating material, so that the resultant insulating layer 13 would have, on one side of the masking wall 20, a portion in which a smaller amount of insulating material is deposited, or a portion in which the thickness of the insulating layer is gradually reduced toward the masking wall 20. Then in the next process, the surface of the insulating layer 13 on the substrate 10 is so disposed to have a tilt relative to the flowing direction of a sputtered metal thin film electrode material, so that the resultant metal thin film electrode 15 would have, on one side of the masking wall 20, a portion in which a smaller amount of the metal thin film electrode material is deposited, or a portion in which the thickness of the metal thin film electrode is gradually reduced toward the masking wall 20. In these "tilted" sputtering processes of the insulating layer and metal thin film electrode, when angles of the substrate 10 in a sputtering apparatus are selected so as to allow the incidence angle θ of the flow of the sputtered metal thin film electrode material to be larger than the incidence angle θ of the flow of the sputtered insulating material, the resultant island region 14 would then have a structure in which the metal thin film electrode 15 terminates at an edge "A" located on the insulating layer 13. The insulating layer 13 within the island region 14 terminates at an edge "B" located on the electron source layer 12. It is also possible to form a structure in which the masking wall and 20 the deposits thereon are eliminated by etching etc. to have the electron source layer 12 exposed.

Figure 14:
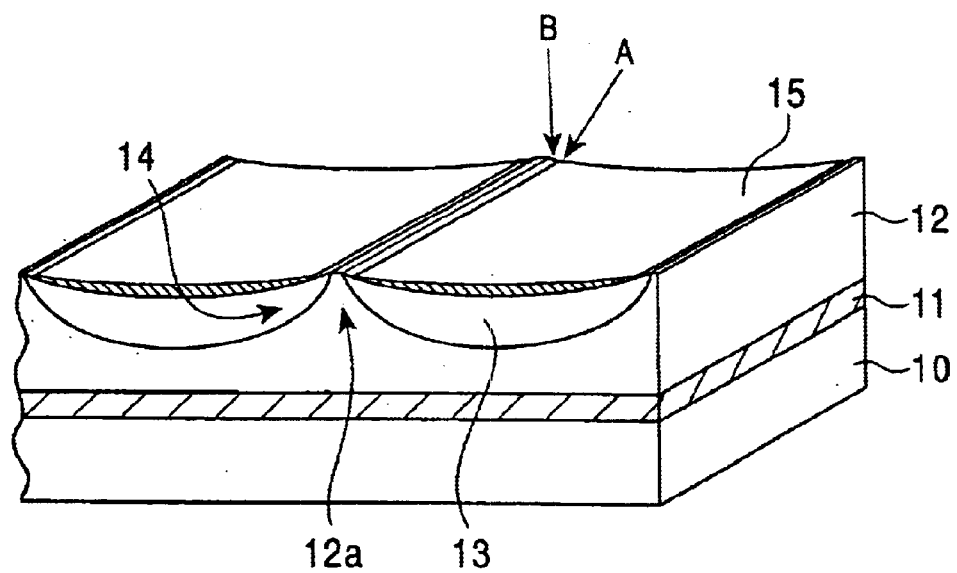

In the above embodiment, although the island regions were explained as being formed as recesses, each of the island regions may be formed as a flat or convex structure in which the thicknesses of the insulating layer 13 and the metal thin film electrode 15 are gradually reduced. For example, as another embodiment, a flat or convex island region 14 in which the film thicknesses of the insulating layer 13 and the metal thin film electrode 15 are gradually reduced toward a peak of a spiked portion 12a of the electron source layer 12 as shown in FIG. 14. This flat or convex island region 14 is formed by techniques such as photolithography and etching etc. The spiked portions 12a of the electron source layer 12 may be formed as a mountain range, alternatively as individual convex features distributed over the surface. In these cases also, the metal thin film electrode 15 terminates at the edge "A" located on the insulating layer 13, and the insulating layer 13 terminates at the edge "B" located on the electron source layer 12. It is also possible to form a device having a structure in which the electron source layer 12 is completely covered by laying the insulating layer 13 over the peaks 12a of the electron source layer 12.

Figure 15:
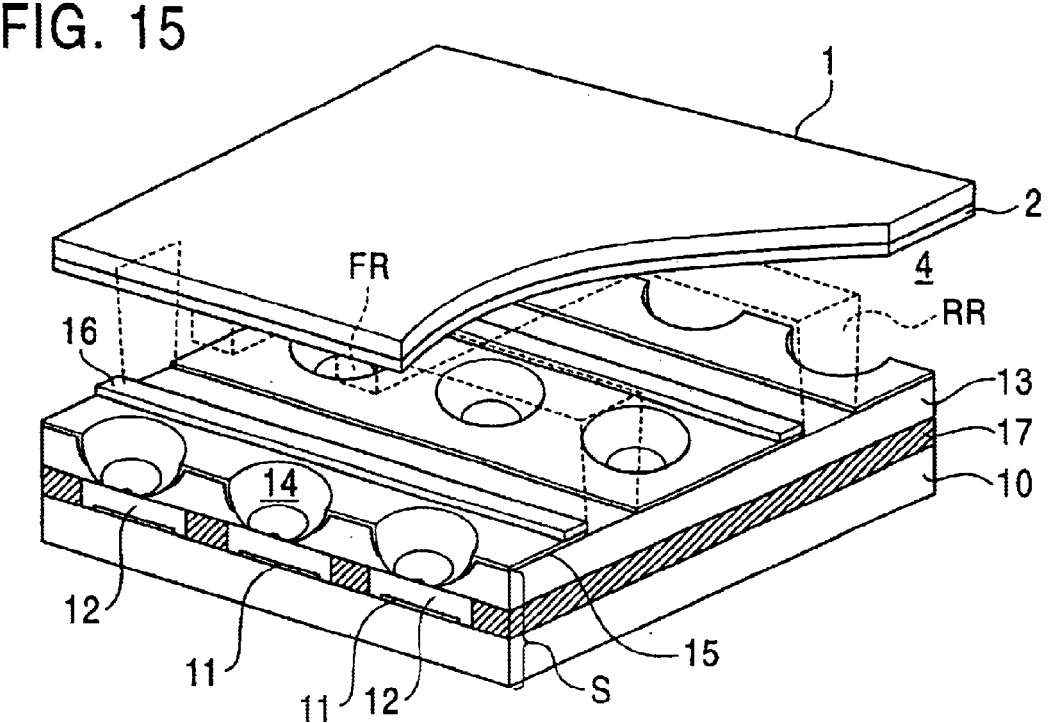
FIG. 15 is a schematic partial perspective view indicating an image pickup device using the electron-emitting devices according to one embodiment of the present invention.

FIG. 15 shows an image pickup device in which the electron emission devices of an embodiment of the present invention were applied.

On the interior surface on the side of a vacuum space 4 of the backside substrate 10, a plurality of ohmic electrodes 11 extending in parallel to each other are formed. Along each common ohmic electrode 11, a plurality of electron-emitting devices S are arranged. A plurality of metal thin film electrodes 15 extending in parallel to each other are provided in a direction perpendicular to the ohmic electrodes 11. A plurality of bus lines 16 are provided along one side of the metal thin film electrodes 15 in a parallel arrangement. The bus lines 16 are connected to, for example, pulse generators for vertical-direction scanning, and given signals are applied to them respectively. The ohmic electrodes 11 are connected to, for example, pulse generators for the horizontal-direction scanning, and given signals are respectively applied to them in synchronization with the vertical-direction scanning pulses. The intersections between the ohmic electrodes 11, the metal thin film electrodes 15 and the bus electrodes 16 represent the array of the electron-emitting devices S. On the interior surface of the front substrate 1, the transparent electroconductive film 3 made of such as PbO, or so-called ITO and a multi-layered photoconductive layer 2 made of As, Te, $Sb_2S_3$, Cd, a-Se or the like are formed in turn. The photoconductive layer 2 is connected to output circuits via the transparent electroconductive film 3. Therefore, in an image pickup device of the present invention, the electron-emitting devices S are sequentially driven by the ohmic electrodes and the bus lines, and adjacent regions of the photoconductive layer 2 are scanned by emitted electrons, thereby obtaining a video signal which is photoelectrically converted from an image formed by the photoconductive layer 2.

As shown in FIG. 15, each of the electron-emitting devices S comprises an electron source layer 12, an insulating layer 13 and a metal thin film electrode 15 sequentially formed on an ohmic electrode 11. The insulating layer 13 and the metal thin film electrode 15, in a direction their interface extends, have island regions 14 in which their film thicknesses are gradually reduced together. The metal thin film electrode 15 is facing the vacuum space 4.

It should be especially noted that insulating supporting members 17 encompassing each of the electron-emitting devices S to segregate them into a plurality of electron-emitting sections. These insulating supporting members 17 prevent line breaks. That is, as shown in FIG. 15, the insulating supporting members 17 or a material having a large electric resistivity are formed beforehand, to a thickness substantially equal to the final thickness of the electron-emitting devices which are to be formed in the subsequent processes, on the periphery sections other than the areas for electron-emitting devices.

Moreover, in this embodiment, partition walls RR (indicated by broken lines) on the side of the backside substrate are formed on the insulating supporting members 17 so that they project out to the vacuum space 4 from the backside substrate 10. The partition walls are aligned at a predetermined interval. In FIG. 15, each partition wall RR was illustrated as being formed for the each column of the electron-emitting devices S, however, the partition walls RR may be formed at a larger interval, for example, one for every 2 or 3 columns of the electron-emitting devices S. Also, in FIG. 15, the partition walls RR were illustrated as being formed continuously in a direction substantially parallel to the metal thin film electrodes 15, however, they may be formed intermittently by leaving only the top areas that are to be abutted to second partition walls FR (indicated by broken Lines) on the side of the front substrate 1.

In addition, these partition walls RR are preferably formed in a way so as to allow their top areas to be larger than their bottom areas which contacts with the backside substrate. In other words, the partition wall RR is preferably formed to have an overhang which projects in a direction substantially parallel to the backside substrate in its top portion.

Furthermore, in FIG. 15, the metal thin film electrodes 15 were illustrated as being formed continuously, however, the metal thin film electrodes 15 may be configured as isolated structures for the respective devices and connected together with the bus electrodes 16. The bus electrodes 16 provided over the metal thin film electrodes 15 were illustrated as having a simple rectilinear shape, however, the bus electrodes 16 may have, instead of a rectilinear shape, a shape having wider sections over the areas between the metal thin film electrodes 15 of the electron-emitting devices, and narrower sections over the metal thin film electrodes, in other words, a larger width over the areas between electron-emitting devices and a smaller width over the devices. In this way, the resistivity of the bus electrode may be reduced.

As for the material of the ohmic electrode 11, a material typically used in IC wiring, such as Au, Pt, Al, W or the like may be used, but a 3-layer structure of chrome-nickel-chrome, an alloy of Al and Nd, an alloy of Al and Mo or an alloy of Ti and N may also be used as well. Its thickness should be uniform to be able to supply substantially the same amount of current. Although it is not particularly indicated in FIG. 15, an insulating layer made of an insulator such as $SiO_x$, $SiN_x$, $Al_2O_3$, AlN or the like may be provided between the backside substrate 10 and the ohmic electrodes 11. The insulating layer serves to prevent the adverse effect from the backside glass substrate 10 (elution of impurities to alkaline components etc. or unevenness in the substrate surface) over the devices.

The material of the metal thin film electrode 15 is preferably one having a small work function φ in the light of the principle of the electron emission. To maximize the electron emission efficiency, the material of the metal thin film electrode 15 is preferably selected from the group I and II metals, for example, Cs, Rb, Li, Sr, Mg, Ba and Ca etc., or an alloy thereof. Furthermore, a chemically stable metal having high electroconductivity is also preferable as the material of the metal thin film electrode 15. For example, Au, Pt, Lu, Ag or Cu, or an alloy thereof is desirable. These metals coated or doped with any of the above metal explained as having a small work function are similarly effective.

As for the material of the bus electrode 16, a material typically used for IC wiring, such as Au Pt, Al, Cu or the like may be used. A sufficient thickness should be selected for providing substantially the same amount of current to each of the devices, and the adequate thickness is between 0.1 μm and 50 μm. However, if the resistivity is tolerable, the material used for the metal thin film electrode may be used instead of the bus electrode.

Figure 16:
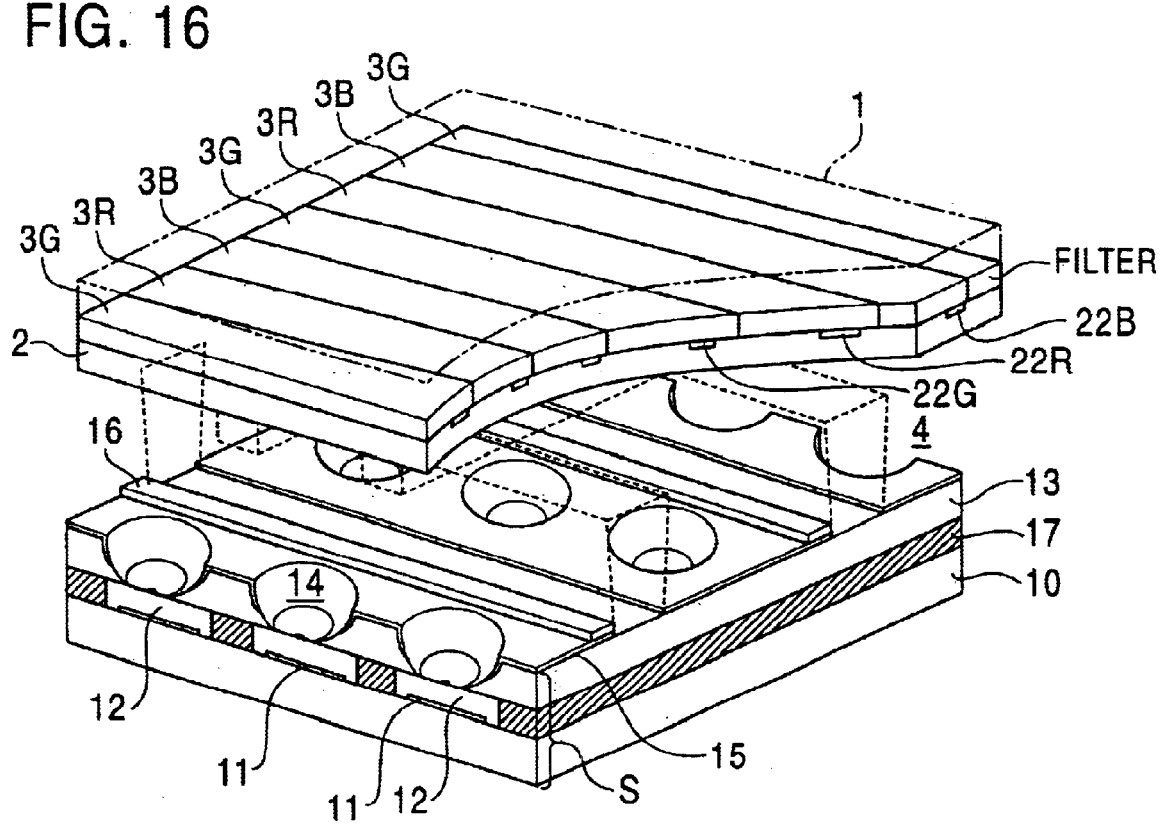
FIG. 16 is a schematic partial perspective view of an image pickup device using electron-emitting devices according to an alternative embodiment of the present invention.

On the interior surface (surface facing the backside substrate 10) of the translucent front substrate 1, such as a transparent glass substrate, serving as a light-receptive surface, a photoconductive layer 2 is formed integrally, and a high voltage is applied thereto. In addition to the above embodiment explained as being a monochrome image pickup device, a three-electrode type image pickup device may be obtained by providing on the front substrate, a filter comprising filter sections 3R, 3G and 3B that transmit red, green and blue light respectively in a direction substantially parallel to the metal thin film electrode 15, and also providing signal electrodes 22R, 22G and 22B corresponding to the respective filter sections in parallel thereto as shown in FIG. 16.

Over the photoconductive layer 2, front ribs (second partition walls) FR are formed in plurality in parallel to the ohmic electrodes 11. The areas of the photoconductive layer 2 exposed between the elongated front ribs face to the vacuum space 4. In this way, at the boundaries between areas of the photoconductive layer, the front ribs (second partition walls) FR for retaining a constant spacing (i.e. 1 mm) between the backside substrate and the front substrate are provided. The front ribs (second partition walls) are provided over the front substrate in a perpendicular direction relative to the rear ribs (partition walls) RR provided on the backside substrate 10.

What is claimed is:

1. An image pickup device comprising:
   a pair of first and second substrates facing each other with a vacuum space interposed therebetween, the second substrate being transparent;
   a plurality of electron-emitting devices provided over said first substrate on a side of the vacuum space,
      said electron-emitting devices each comprising:
         an insulating layer deposited over an electron source layer which is formed over an ohmic electrode; and
         a metal thin film electrode deposited over said insulating layer, wherein said insulating layer and said metal thin film electrode include an island region as an electron-emitting section in which film thicknesses thereof are gradually reduced toward said electron source layer; and
   a photoconductive layer provided over said second substrate on a side of the vacuum space to photoelectrically convert an incident light passing through the second substrate into an electric signal.

2. An image pickup device as claimed in claim 1 wherein said insulating layer is made of a dielectric material and has a film thickness of 50 nm or greater in an area other than said island region.

3. An image pickup device as claimed in claim 1 wherein said metal thin film electrode terminates over said insulating layer within said island region.

4. An image pickup device as claimed in claim 1 wherein said insulating layer terminates over said electron source layer within said island region.

5. An image pickup device as claimed in claim 1 wherein said island region is a recess on a flat surface of said metal thin film electrode.

6. An image pickup device as claimed in claim 1 wherein said insulating layer and said metal thin film electrode are deposited by one of a physical deposition method and a chemical deposition method.

7. An image pickup device as claimed in claim 1 wherein bus lines are formed over a plurality of said metal thin film electrodes, said ohmic electrodes and said bus lines being stripe-shaped electrodes arranged in directions orthogonal to each other.

8. An image pickup device as claimed in claim 1, the device further comprises a reverse-tapered block within each of said island regions.

* * * * *